Feb. 27, 1934.   N. H. DUCKWORTH   1,948,905
MACHINE FOR SPLITTING ABACA STALKS
Filed Jan. 19, 1931   3 Sheets-Sheet 1
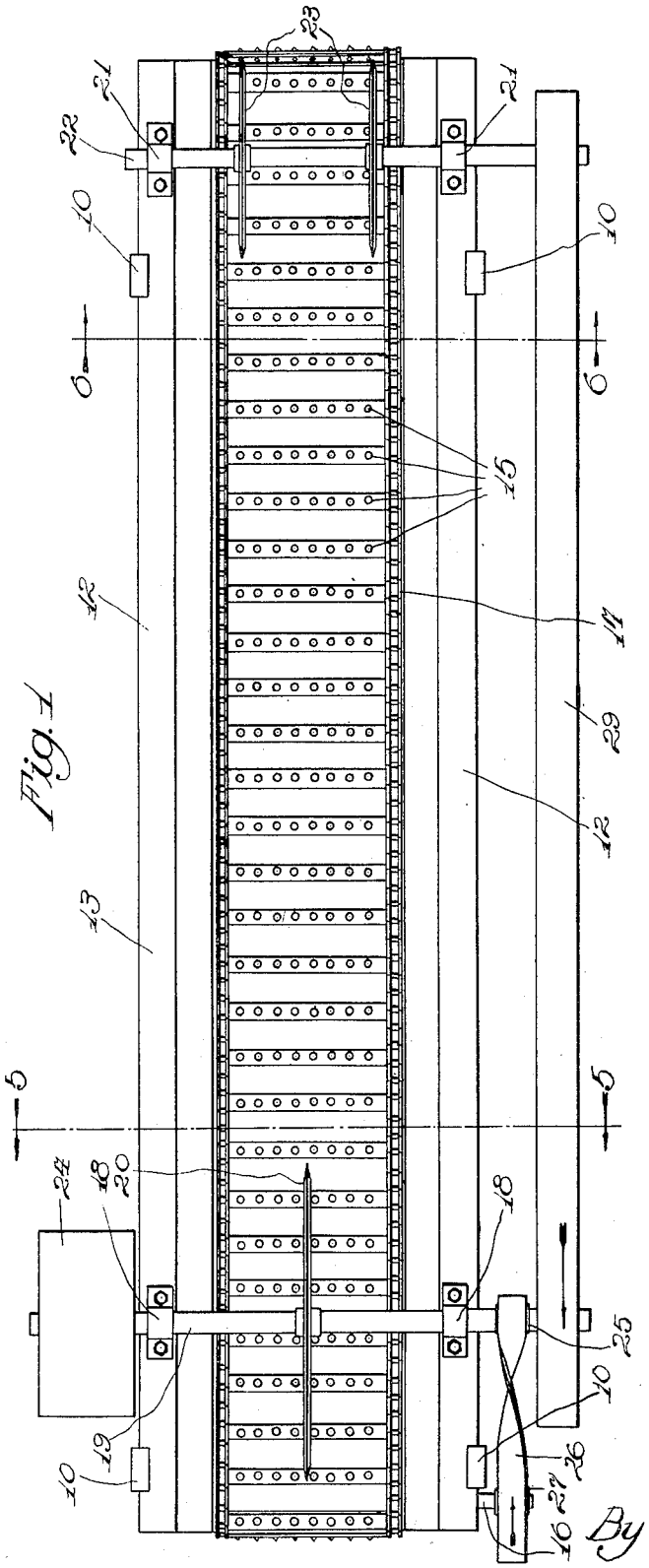
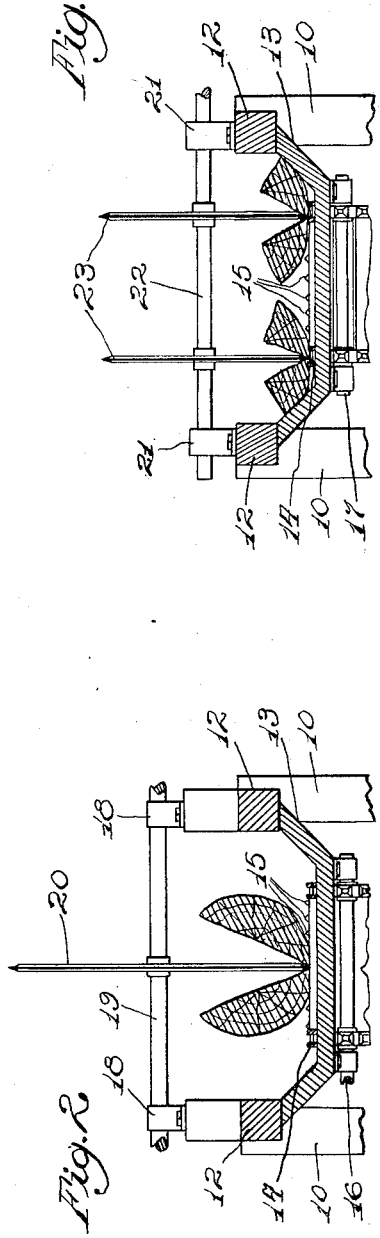
Inventor.
N. H. Duckworth
By N. P. Desciak Atty.

Feb. 27, 1934. N. H. DUCKWORTH 1,948,905
MACHINE FOR SPLITTING ABACA STALKS
Filed Jan. 19, 1931 3 Sheets-Sheet 2

Inventor
N. H. Duckworth
By [signature] Atty.

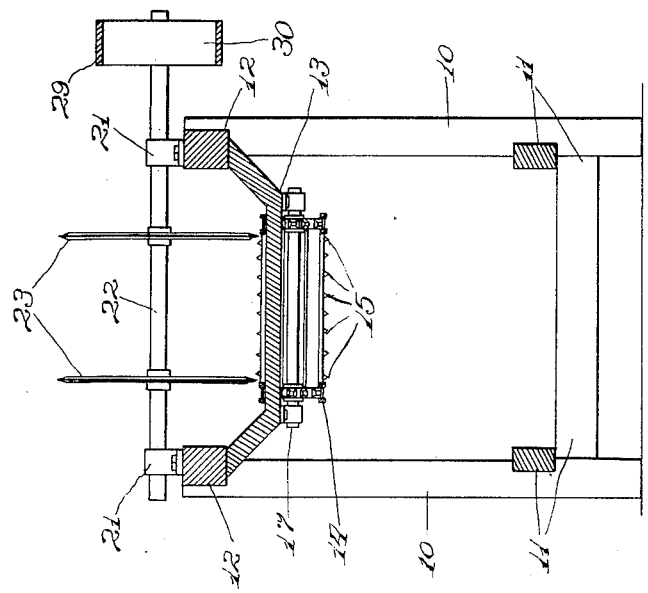
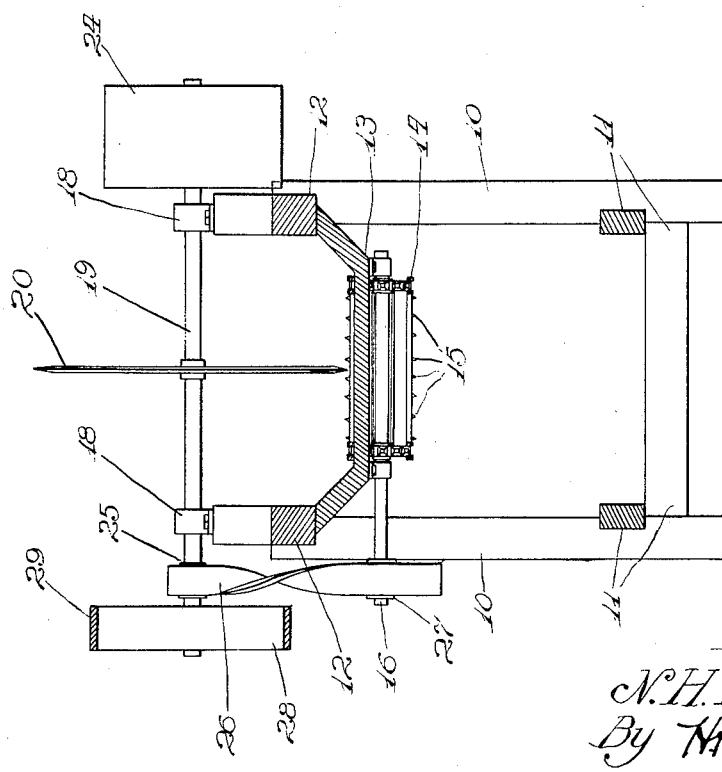

Patented Feb. 27, 1934

1,948,905

UNITED STATES PATENT OFFICE 1,948,905

MACHINE FOR SPLITTING ABACA STALKS

Nevin H. Duckworth, Davao, Philippine Islands, assignor to International Harvester Company, a corporation of New Jersey Application January 19, 1931. Serial No. 509,668

2 Claims. (Cl. 146—73)

This invention relates to a machine for splitting manilla hemp or abaca tree stalks preparatory to removing the fibers therefrom with a decorticating machine.

In some geographical localities, such for example as in the Philippines, the fibers have been in the past removed from the stalk by hand, such cleaning being obviously very laborious in addition to the fact that it is a slow and expensive process, resulting in a lower production of fiber from the hemp or abaca tree than is secured from cleaning the fiber with a decorticating machine. Fiber production, therefore, favors the use of decorticators. Before the decorticating operation, it was necessary to split the stalks into quarter sections, so that the decorticating machine could handle the same. This also was laborious and slow when done by hand as it has been done, because some of the hemp trees reach a height of 12 to 20 feet and have a diameter of from 4 to 8 inches.

The object of this invention, therefore, is to provide a simple machine which will handle these stalks or logs, such machine in one pass of the log therethrough severing the same into halves and then severing the halves into quarters.

Briefly, these desirable objects may be achieved by the illustrative example of the invention shown in the accompanying sheets of drawings showing a framework supporting a longitudinal platform, which platform has arranged thereabove at one end a cutter which splits a log fed thereto in half. These half stalk or log sections are then laid over and fed into two other cutters at the discharge end of the machine, said last two cutters splitting the half sections of the stalks into quarter sections.

In these drawings,—

Figure 1 is a plan view of the improved stalk splitting machine;

Figure 2 is an end view, partly in section, showing how a stalk is halved;

Figure 3 is a similar view, showing how the halves are quartered;

Figure 5 is a cross sectional view of the machine as seen along the line 5—5 in Figure 1 when viewed in the direction of the arrows; and, Figure 6 is a similar cross sectional view as seen along the line 6—6 of Figure 1, looking in the indicated direction.

Figure 4:
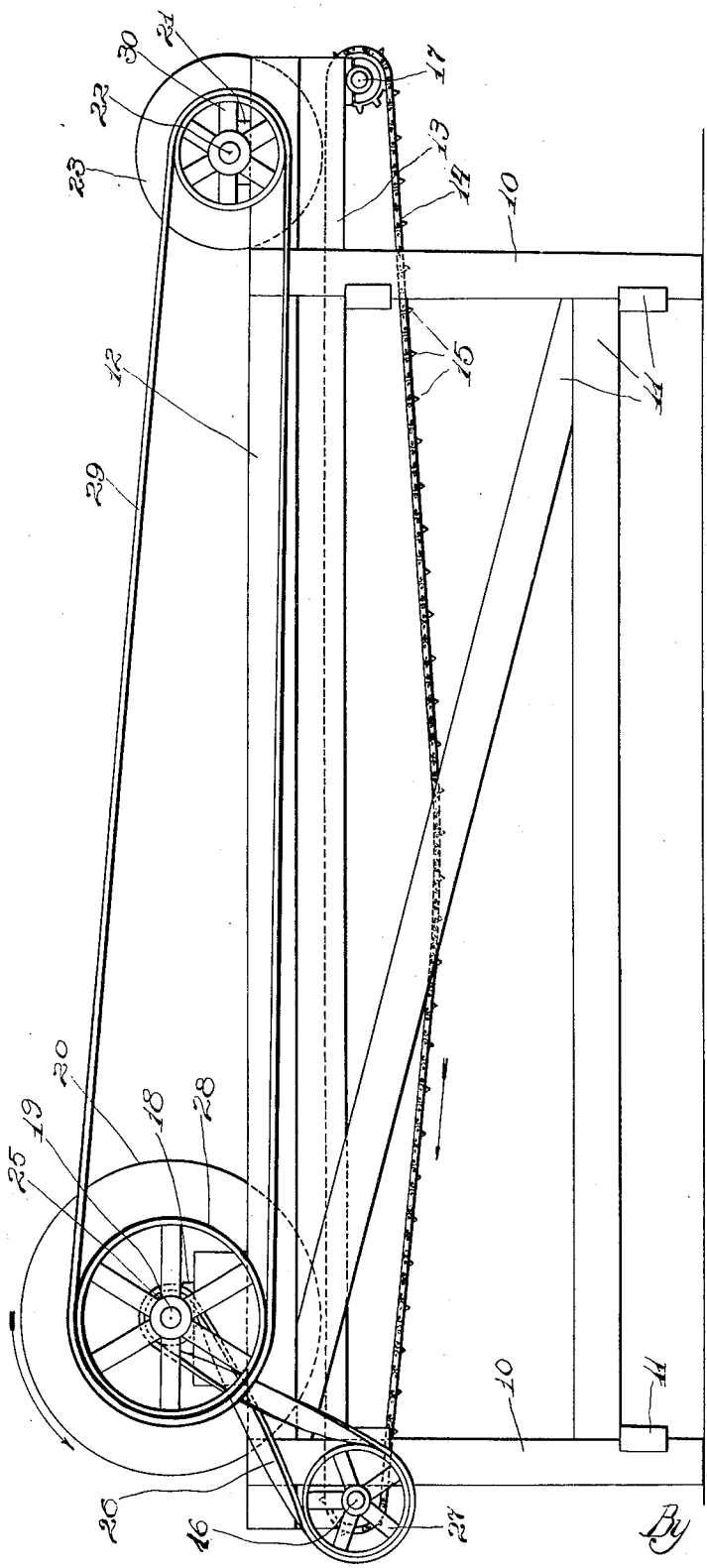
Figure 4 is a side elevational view of the machine.

As shown in these drawings, the supporting frame includes corner posts 10 suitably connected by longitudinal and transverse brace members 11, said framework carrying at its top sides two longitudinally running beams 12. These beams or frame carry a dropped, longitudinally running rectangularly elongated, and horizontally disposed platform 13, around which may be trained a longitudinally running conveyer 14, the conveyer elements of which may be provided with spikes or barbs 15. This conveyer 14 is endless to operate across the platform 13, and is trained around appropriate sprocket wheels carried on front and rear shafts 16 and 17, respectively. In effect then this platform is formed as a trough having a flat bottom across which the conveyor drags.

The front or charging end of the machine is provided with journals 18, which rotatably carry a front transverse cross shaft 19, on which is mounted a single rotary cutter 20 disposed in alignment with the central longitudinal axis of the machine, as best shown in Figure 1. The rear end of the frame is provided with suitable journals 21 for carrying a rear, transverse shaft 22, said shaft carrying a pair of spaced, rotary cutters 23, one each of these cutters being spaced a predetermined distance to one side of the longitudinal median line of the machine.

The shaft 19 at one end carries a pulley 24 for connection with a belt to any suitable source of power, while the other end of the shaft 19 carries a small pulley 25 connected by a twisted belt 26 to a pulley 27 on the shaft 16, and in this manner power is applied to drive the conveyer 14 from the front to rear along its top run across the platform 13 to feed abaca stalks or logs in an obvious manner. The shaft 19 also carries a pulley wheel 28, around which is trained a belt 29, which in turn is trained around a pulley wheel 30 on the shaft 22. In this manner the rear shaft 22 and cutters or knives 23 are rotatively driven.

In the use of this improved machine, an abaca stalk is fed centrally at the charging end of the conveyer 14 in its lengthwise direction into the rotary cutter 20 in the manner illustrated in Figure 2. The barbs 15 on the conveyer grip the log and move the same along, as shown in Figure 2, until the rotary knife 20 has completely split and severed the log. As the tail end of the log passes beyond the knife 20, the half sections of the log are laid over automatically to the right and to the left on the conveyer 14 and in this fashion are moved head-on into the rearwardly disposed knives 23, severing the half sections of the log into quarter sections. When these quarter sections have passed through the rear knives, they will be thrown off the conveyer onto the ground where they can be gathered for transportation to a decorticating machine.

Obviously, this machine must have its front and rear knives spaced apart a longitudinal distance greater than the length of the log to be split, so that the log, when halved by the front knife 20, will have room to permit its half sections to be laid over and fed into the rear knives which split the half sections. A conveyer is added to the machine to make the operation continuous, but obviously the conveyer may be dispensed with and the logs be fed and moved along the platform by hand.

It is the intention to cover all such changes and modifications of this invention as do not depart from the spirit and scope thereof as expressed in the appended claims.

What is claimed is:

1. A stalk cutter machine comprising a main frame, an elongated horizontally disposed flat platform carried on the frame, said platform having outwardly and upwardly inclined sides to form a trough, a longitudinally positioned frame sill carried on each trough side, a transverse shaft journaled on the frame sills at one end of the machine, a single cutter on the shaft arranged centrally over the platform between the edges of the platform, a second transverse shaft at the other end of the machine and also journaled on the frame sills, said second shaft carrying a pair of cutters arranged over the platform with one disposed relatively close to each edge of said platform, the longitudinal distance between the cutter at one end and the cutters at the other end being greater than a predetermined length of stalk to be cut, an endless conveyer traveling longitudinally over the platform, said conveyer being of substantially the same width as the platform, whereby a stalk fed in its lengthwise direction along the longitudinal median line of the platform to the single cutter is halved thereby and said halves then laying over on the platform toward the edges thereof with each half in a position to be fed to each remaining knife at the other end of the machine to be split in half again, and means to drive the shafts to operate the cutters.

2. A stalk cutter machine comprising a main frame, an elongated horizontally disposed flat platform carried on the frame, said platform having outwardly and upwardly inclined sides to form a trough, a transverse shaft journaled on the frame at one end of the machine, a single cutter on the shaft arranged centrally over the platform between the edges of the platform, a second transverse shaft at the other end of the machine and also journaled on the frame, said second shaft carrying a pair of cutters arranged over the platform with one disposed relatively close to each edge of said platform, the longitudinal distance between the cutter at one end and the cutters at the other end being greater than a predetermined length of stalk to be cut, whereby a stalk fed in its lengthwise direction along the longitudinal median line of the platform to the single cutter is halved thereby and said halves then laying over on the platform toward the edges thereof with each half in a position to be fed to each remaining knife at the other end of the machine to be split in half again, a conveyer dragging across the flat platform to convey the stalks to the cutters, said conveyer being of substantially the same width as the platform, and means to drive the conveyer and shafts to operate the cutters.

NEVIN H. DUCKWORTH.